United States Patent [19]

Fukuzawa et al.

[11] Patent Number: 4,791,691
[45] Date of Patent: Dec. 20, 1988

[54] WASHING MACHINE AND METHOD OF WASHING CLOTHES

[75] Inventors: Sooichi Fukuzawa, Hitachi; Tamotu Shikamori, Jyuou, both of Japan

[73] Assignee: Hitachi, Ltd., Tokyo, Japan

[21] Appl. No.: 855,936

[22] Filed: Apr. 25, 1986

[30] Foreign Application Priority Data

Apr. 25, 1985 [JP] Japan .................................. 60-87412

[51] Int. Cl.⁴ ............................................ D06F 13/02
[52] U.S. Cl. .......................................... 8/159; 68/133
[58] Field of Search ............... 68/131, 133, 12 R, 207; 8/158, 159

[56] References Cited

U.S. PATENT DOCUMENTS

| | | | |
|---|---|---|---|
| 2,575,691 | 11/1951 | Smith | 68/133 X |
| 3,369,381 | 2/1968 | Crane et al. | 68/23.7 X |
| 3,539,153 | 11/1970 | Wennerberg | 68/12 R |
| 3,605,455 | 9/1971 | Olthuis | 68/207 |
| 3,611,759 | 10/1971 | Janke | 68/207 |
| 4,303,406 | 12/1981 | Ross | 68/12 R |

Primary Examiner—Harvey C. Hornsby
Assistant Examiner—Frankie L. Stinson
Attorney, Agent, or Firm—Antonelli, Terry & Wands

[57] ABSTRACT

A clothes washing machine and method wherein a washing liquid is ejected and circulated through a suction pump in a connecting hose from an outer tub, with the recirculated washing liquid being sprinkled all over the clothes through a sprinkling port. An amount of washing liquid to be supplied into the washing tub is set to be about three to eight times larger than that of the clothes to be washed in a weight ratio and washing is performed by carrying out a sprinkling or spraying of the washing liquid on the clothes. By setting an amount of washing liquid supplied to the washing tub to be as small as three to eight times the amount of clothes to be washed in a weight ratio, the clothes are prevented from floating upon the washing liquid and, accordingly, it is possible to promote a friction, expansion, and contraction action of the clothes and to increase a direct frictional effect caused by an agitator of the washing machine.

5 Claims, 2 Drawing Sheets

WASHING MACHINE AND METHOD OF WASHING CLOTHES

BACKGROUND OF THE INVENTION

The present invention relates to a washing machine and washing method and, more particularly, to a washing machine and method of washing clothes which improves the overall washing efficiency of the clothes while greatly reducing the required washing liquid.

In, for example, Japanese Patent Laid-Open Publication No. 61791/1983 and Japanese Utility Model Publication No. 870/1985, clothes washing machines and method of washing clothes are proposed which are designed to utilize a larger amount of washing liquid in the washing tub of the washing machine, with the amount of washing liquid being about ten to thirteen times greater than that of the clothes being washed in a weight ratio at a rated weight, and about thirty times larger in situations wherein a weight of the clothes is less than the rated weight for the machine.

In the machine and method proposed in Japanese Utility Model Publication No. 870/1985, the washing of the clothes is carried out while applying a stirring or agitating action to the clothes through the washing liquid by a pulsator.

A disadvantage of both of the washing machines and methods propose in the aforementioned Japanese Publications resides in the fact that, since the clothes float up on the washing liquid, friction and expansion and a contraction action of the clothes are small and, consequently, the washing of the clothes is primarily dependent upon the friction caused by the direct contact with the clothes and the pulsator or the agitator.

Consequently, in the above proposed washing machines and methods, a sufficient consideration has not been given to the occurrence of uneven washing between the clothes with a high contact frequency with the pulsator or agitator and those with a low contact frequency as well as a consideration of a reduction of the amount of washing liquid, amount of detergent, and length of time for supplying and discharging the washing liquid and length of time necessary for effecting the entire washing operation.

The aim underlying the present invention essentially resides in providing a clothes washing machine and washing method which ensures the attainment of an improved overall washing performance.

A further object of the present invention resides in providing a washing machine and method which enables the amount of washing water utilized with regard to the washing liquid to be relatively small.

In accordance with advantageous features of the method of washing clothes in accordance with the present invention, a predetermined amount of clothes is put into a washing tub of the washing machine and a predetermined amount of liquid such as water is supplied into the washing tub. A stirring wing or agitator, provided in the washing tub is rotated, and the water liquid from the washing tub is recirculated. The recirculated water liquid is then supplied to the washing tub.

In accordance with advantageous features of the washing machine and washing method of the present invention, an amount of washing liquid, i.e., washing water plus detergent to be supplied into the washing tub of the washing machine is about three to eight times greater than that of the clothes to be washed in a weight ratio, with the washing being performed while sprinkling the washing liquid on the clothes being washed.

By setting the amount of washing liquid supplied into the washing tub at a washing time to be as small as about three to eight times the amount of clothes in a weight ratio, the clothes are prevented from floating on or up in the washing liquid and, accordingly, it is possible to promote a friction along with expansion and contraction action of the clothes thereby increasing a direct frictional effect caused by the blades of the agitator or stirring wing.

Moreover, by virtue of the features of the present invention, a brake effect and a stirring or agitating effect moderately brought about by projections or projection lying portions provided on a wall surface of the washing tub enables the washing liquid to be sprinkled over the clothes in an exposed state caused by the effects as the replacement of the clothes is promoted in order to allow the clothes to always be impregnated with a necessary and sufficient amount of washing liquid when the washing operation is carried out.

Consequently, by virtue of the present invention, it is possible to achieve a strong friction action as well as an expansion and contraction action whereby it is possible to realize an excellent washing effect with a small amount of washing liquid.

The present invention provides a washing machine and washing method which not only has an excellent washing performance but also enables a water saving with the amount of washing water used relating to the washing liquid being relatively small while nevertheless providing excellent practical effects.

The above and other objects, features, and advantages of the present invention will become more apparent in the following description when taken in connection with the accompanying drawings which show, for the purpose of illustration only, to embodiments in accordance with the present invention.

DETAILED DESCRIPTION

Figure 1:
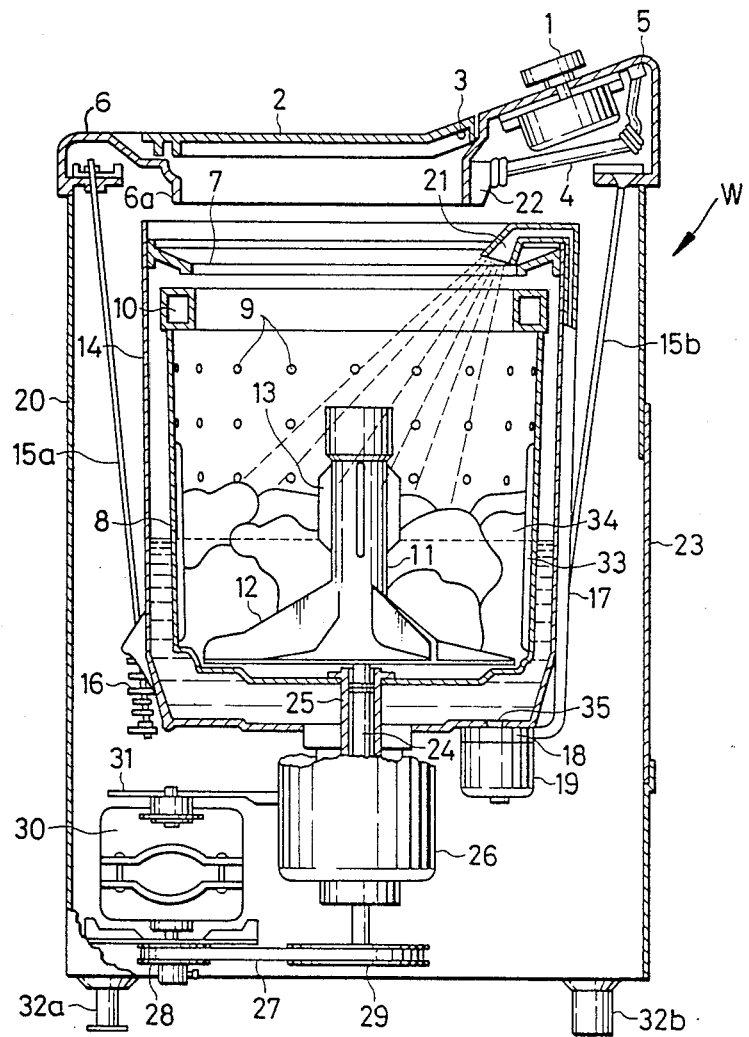
FIG. 1 is a longitudinal cross-sectional view of a clothes washing machine-spinning combination constructed in accordance with a first embodiment of the present invention.

Referring now to the drawings when like reference numerals are used throughout the various views to designate like parts and, more particularly, to FIG. 1, according to this figure, a clothes washing machine generally designated by the reference character W, of a washing-spinning combination type, includes a housing or cabinet 20 mounted on front and rear legs or supports 32a, 32b, with at least the front legs or supports 32a being height adjustable in a conventional manner for the purpose of leveling the washing machine W. The housing or cabinet 20 includes an upper cabinet portion 6 having an opening 6a for enabling an insertion and removal of clothes 34 from the washing machine W. An outer washing tub 14 is disposed in the housing or cabinet 20, with a washing basket or inner tub 8 being concentrically mounted in the outer washing tub 14, in a manner described more fully hereinbelow. Advantageously, an inner diameter of the washing basket or inner tub 8 is about 410 mm. A lid or cover 2 is pivotally mounted on the upper cabinet portion 6 by pivot means 3, with the lid or cover 2 being adapted to be pivoted upwardly, to permit the insertion of clothes 34 into the washing machine W and downwardly, to close the opening 6a when the washing machine is in operation. An appropriate spin-safety switch (not shown) is provided for terminating a spinning operation of the washing machine W when the lid or cover 2 is opened during a spinning operation.

A timer 1 is provided on the upper cabinet portion 6 for controlling the various operations of the washing machine W such as, for example, the controlling of an opening and closing of a water mixing valve (not shown) during washing and rinsing cycles, the operation of a drive motor for driving an agitator 11 through respective wash and rinse cycles, as well as controlling spinning cycles to enable a whirling of water from the clothes 34, etc. While the timer 1 is illustrated as a mechanical type timer driven, for example, by either a spring or an electric drive motor (not shown), it is understood that the timer may be in the form of push buttons either mechanical or so-called touch-sensitive type buttons.

A connecting pipe or conduit 4 is interposed and connecting at respective ends to a coupling or connection means 5 adapted to be connected to a water supply system (not shown) and a water supply discharge section 22 for discharging water to the inner and outer tubs 8, 14. A suitable water temperature selector (not shown) and an appropriate pressure switch (not shown) may be connected to the coupling or connection means 5 for enabling a control of the water temperature and pressure thereof supplied from the water supply system.

An annular cover member 7 is provided in an area of the opening 6a and extends over a space between the inner tub or basket 8 and the outer tub 14 for preventing the clothes 34 from falling between the inner and outer tubs 8, 14. A plurality of holes 9 are provided in a wall surface of the inner tub or clothes basket 8 for enabling discharge of water a therethrough during a spinning operation of the washing machine W. A balance ring 10 is provided at an upper end of the inner tub or clothes basket 8 for enabling smooth rotation of the inner tub or clothes basket 8 during a spinning operation. The stirring wing or agitator 11 includes a plurality of spaced main blades 12 and small blades 13 both of which function to agitate or stir the clothes 34 to perform a washing of the clothes 34 by friction as well as expansion and contraction action of the clothes 34 and friction of the clothes 34 directly caused by the main blades 12 and small blades 13 of the agitator 11. Advantageously, the agitator 11 rotates alternately in a forward clockwise and counter-clockwise direction at a speed of about 180-190 rpm, with a diameter of the agitator being about 320 mm.

Suspension bars 15a, 15b elastically suspend the outer washing tub 14 through a spring arrangement 16. A hose or conduit 17 connects an inlet port 35 of a suction pump 18, provided at the bottom of the outer tub 14, with a sprinkling port 21. The suction pump 18, driven by an electric motor 19, circulates a washing liquid of, for example, wash water plus a detergent and/or softening additives, through the hose or conduit 17 to the sprinkling port 21, so as to enable a sprinkling of the washing liquid on the clothes 34 in the washing basket or inner tub 8.

A removable rear lid 23 is provided on a backside of the housing or cabinet 20 so as to enable access to the components of the washing machine W. A shaft 24 is driven from the motor 30 through a belt 27, a motor pulley 28, a driven pulley 29 and a clutch and brake arrangement arranged in a decelerating section 26, with the shaft 24 transmitting the driving force from the drive motor 30 to the agitator 11.

A hollow shaft 25 is provided for rotating the basket or inner tub 8 at a high speed during a spinning operation of the washing machine W by virtue of instructions received from a control means (not shown) operatively connected to the timer 1. A stayer support member 31 is provided in the cabinet or housing 20 for supporting the drive motor 30 and longitudinally extending projections 33, extending in an upward and downward direction, are provided on an inner wall surface of the washing basket or inner tub 8 for effecting a moderate braking action and stirring or agitating of the clothes 34.

Advantageously, the main blades 12 of the agitator 11 are in a range of about 0.4 to 0.8 times an inner diameter of the washing basket or inner tub 8, with the specific range being determined experimentally so as to assure the fact that there is no significant diminishing of the overall performance of the washing machine W.

With a construction such as described herein above in connection with FIG. 1, after the clothes 34 as well as the detergent and/or softening additives are put into the washing basket or inner tub 8, the washing machine W automatically feeds the detergent and/or softening additives and washing water at a rate of about three to eight times as large as the weight of the clothes 34 and begins to rotate the agitator 11. At that time, the suction pump 18 begins to operate so as to sprinkle the washing liquid on the clothes 34 from the sprinkling port 21. Thus, the clothes washing machine W is capable of performing a washing while the clothes 34 are sufficiently impregnated with the washing liquid.

In accordance with the clothes washing machine and clothes washing method of the embodiment of FIG. 1, when the weight of the clothes 34 is, for example, at a rated weight of 4 kg, the amount of washing liquid for the washing basket or inner tub 8 is set to be from 12 liters to 32 liters, with such amount being set by a pressure switch (not shown) which functions to set a level of the washing liquid.

The washing liquid is ejected and circulated through the suction pump 18, the connecting holes or conduit 17, and the sprinkling port 21 in the washing basket or inner tub 8 from the bottom of the outer tub 14. The washing time is set for about ten minutes, with the washing cycle employing a reversing cycle by the agitator 11 at 0.3 seconds off, 0.6 seconds on in a clockwise direction, 0.3 seconds off, and 0.6 seconds on in a counterclockwise direction. At that time, since the washing machine W uses a smaller amount of washing liquid as compared with conventional clothes washing machines, the clothes 34 do not float on the washing liquid as is often the case with conventional clothes washing machines. Consequently, the friction and expansion and contraction action of the clothes 34 is considerably larger in the washing machine W then in conventional washing machines. Moreover, the friction effect on the clothes 34 directly caused by the agitator 11 is larger and, the effect mutually caused by the agitator 11 and the surface projecting line portions 33 serve to promote a reversal and replacement of the clothes 34.

Accordingly, by virtue of the present invention it is possible to perform less uneven washing and to obtain such effects as a reduction of the washing time by virtue of an increase of the friction and expansion action of the clothes 34, a reduction of the washing water and detergent and/or additives, a reduction of supply water and drain time of the machine, as well as an overall reduction of the total washing liquid. Additionally, the suction pump 18 for sprinkling the washing liquid has a secondary effect such that except during a washing operation, it can be utilized for other functions such as, for example, a suction of water in the washing tub or the water discharge to a higher place.

Figure 2:
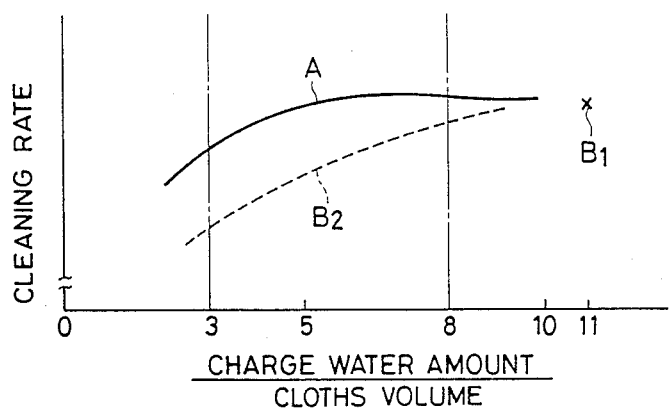
FIG. 2 is a graphical illustration of a comparison of a washing factor between a conventional type washing machine, an experimental type and a machine constructed in accordance with the present invention.

FIG. 2 provides a graphical illustration of a comparison of a washing factor of a washing machine and clothes washing machine of the present invention, a conventional clothes washing machine of a construction such as shown in aforementioned Japanese Patent Laid-Open Publication No. 61791/83, and experimental type.

More particularly, in FIG. 2, a curve A represents a washing factor of the clothes washing machine of the present invention, with a curve $B_2$ representing that of the trial or experimental clothes washing machine constructed by improving a small water consumption type having no sprinkling of a washing liquid, and the point $B_1$ representing that of the conventional washing machine of the noted Japanese Publication. As shown in FIG. 2, the clothes washing machine of the present invention is constructed to have a higher washing factor in a range where the volume of water is small in comparison with the conventional type of clothes washing machine ($B_1$) and the experimental or trial clothes washing machine constructed by improving the conventional type to a small water consumption type with no sprinkling of the washing liquid ($B_2$). FIG. 2 shows that the conventional type washing machine has a washing factor $B_1$ when a ratio of supply-water volume to the clothes weight is about eleven times. Moreover, the performance between the respective machines in the graphical illustration of FIG. 2 is distinguished in a range where a diameter of the agitator 11 provided with blades is about 0.4 to 0.8 times as large as an inner diameter of the washing tub.

Figure 3:
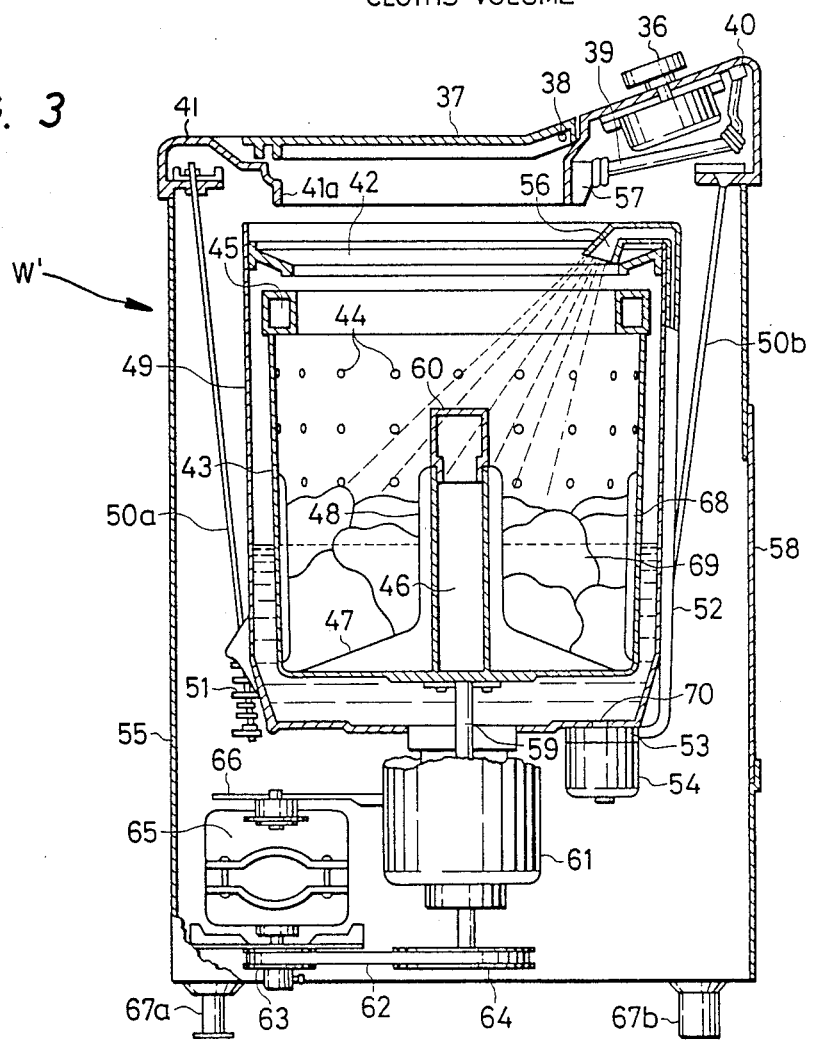
FIG. 3 is a longitudinal cross-sectional view of a clothes washing machine-spinning combination constructed in accordance with another embodiment of the present invention.

In the embodiment of FIG. 3, a clothes washing machine generally designated by the reference character W', also of the washing-spinning combination type, includes a housing or cabinet 55 mounted on front and rear legs 67a, 67b, with at least the front legs or supports 67a being height adjustable in a conventional manner for the purposes of enabling a leveling of the washing machine W'. The housing or cabinet 55 includes an upper cabinet portion 41 having an opening 41a for enabling an insertion and removal of clothes 69 from the washing machine W'. An outer washing tub 49 is disposed in the housing or cabinet 55, with a washing basket or inner tub 43 being concentrically mounted in the outer washing tub 49, in a manner described more fully hereinbelow. Advantageously, an inner diameter of the washing basket or inner tub 43 is about 410 mm. A lid or cover 37 is pivotally mounted on the upper cabinet portion 41 with the lid or cover 37 being adapted to be pivoted upwardly to permit the insertion and removal of clothes 69 into and from the washing machine W' and downwardly to close the opening 41a when the washing machine W' is in operation. As with the embodiment of FIG. 1, an appropriate spin-safety switch is provided for terminating a spinning operation of the washing machine W' when the lid or cover 2 is opened, for example, during a spinning operation.

A timer 36 is provided on the upper cabinet portion 41a for controlling the various operations of the washing machine W', with the timer 36 being of the type described, for example, in connection with the embodiment of FIG. 1.

A connecting pipe or conduit 39 is interposed and connected at respective ends to a coupling or connection means 40 adapted to be connected to a water supply system (not shown) and a water support discharge or supply water section part 57 for supplying or discharging water to the inner and outer tubs 43, 49. As with the embodiment of FIG. 1, a suitable water temperature selector (not shown) and pressure switch (not shown) may be connected to the coupling section for enabling the control of the water temperature and pressure thereof supplied from the water supply system.

An annular cover member 42 is provided for preventing the clothes 69 from falling between the washing tub 43 and the outer tub 49 with the cover member 42 being fixed at an upper portion of the outer tub 49.

A plurality of drain holes 44 are provided in a wall surface of the inner tub or clothes basket 43 for enabling a discharge of water therethrough during a spinning operation of the washing machine W', and a balance ring 45 serves to carry out a smooth rotation of the washing basket or inner tub 43 during the spinning operation.

A stirring wing or agitator 46 includes a plurality of space main blades 47 and small blades 48, with the agitator 46 being adapted to rotate clockwise in a forward direction and counterclockwise together with the inner tub 43 at about 180-190 rpm thereby carrying out a washing operation by virtue o a so-called agitating or swing effect for washing. Advantageously, a diameter of the stirring wing or agitator 43 is about 320 mm.

Suspension bars 50a, 50b serve to elastically suspend the outer tub 49 through a spring arrangement 51, with a connecting hose 51 connecting an inlet port 70 of a suction pump 53, provided on the bottom of the outer tub 49, and serves to connect a discharge side of the suction pump, driven by a motor 54 to a sprinkling port 56 so as to sprinkle a washing liquid ejected by the suction pump 53 to the clothes 69 in the washing tub 43.

A removable rear lid 58 is provided on a backside of the housing or cabinet 55 so as to enable access to the components of the washing machine W'. A shaft 59 is driven from a motor 65 through a belt 62, a motor pulley 63, a driven pulley 64 and a clutch and brake arrangement arranged in a decelerator section 61, with the shaft 59 transmitting the driving force from the drive motor 65 to the washing tub 43 integrated with the agitator 4..

A stay or support member 56 is provided in the cabinet or housing 55 for supporting the drive motor 65 and longitudinally extending projections 68 are provided on an inner wall surface of the washing basket or inner tub 43. A cap 60 is provided on the agitator o stirring wing 46.

The washing method of the washing machine in the embodiment of FIG. 3 is as follows. With, for example, the weight of the clothes 69 being a rated weight of 4 kg, the amount of washing liquid of the washing tub 43 is set to be from twelve liters to thirty two liters, with the amount of the washing liquid being set by the pressure switch which functions to set the washing liquid level. The washing liquid is ejected and circulated through the suction pump 53, the connecting hose 52 and the sprinkling or discharge port 56 into the washing basket or inner tub 43 from the bottom of the outer tub 49. The washing time is about ten minutes and the washing cycle employs a reversing cycle of the agitator 48 of 0.3 seconds off, 0.6 seconds on in a clockwise direction, 0.3 seconds off, and 0.6 seconds on in a counterclockwise direction.

In accordance with the embodiment of FIG. 3, after the clothes 69 and the detergent and/or softening additives are put in the washing tub 43 an amount of the water of about three to eight times larger than the clothes 69 in weight is supplied in the stirring wing 46, integrated or integrally formed with the washing tub 43 is driven to rotate clockwise and counter-clockwise.

At that time, the suction pump 53 begins to work so as to sprinkle the washing liquid on the clothes 69 from the sprinkling port 56. Accordingly, the clothes washing machine W' applied to the washing method of the present invention, can perform a washing as the clothes 69 are sufficiently impregnated with the washing liquid.

In the embodiment of FIG. 3, as with the embodiment of FIG. 1, it is possible to obtain such advantageous effects as a reduction of the washing time and water-supply and drain time, an overall water saving, a saving of detergent and/or softening additives, or the like by virtue of the clothes 69, as well as increasing the expansion and contraction action of the clothes 69 while using a smaller amount of washing liquid.

According to the embodiments of FIGS. 1 and 3 of the present invention, since the clothes 34 or 69 do not float in the washing liquid no portion of the clothes are exposed out of the washing liquid and the friction of the clothes 34 or 69 and the expansion contraction of the clothes 34 or 69 are increased in the friction effect on the clothes 34 or 69 directly caused by the agitator 11 is made greater.

Furthermore, the sprinkling manner proposed by the present invention more effectively utilizes the exposed state of the clothes thereby serving to enlarge the overall washing effect. Moreover, the reversal and replacement of the clothes 34 or 69 caused by the mutual effect of the agitator 11 or 46 and the wall surface projection portions 33 or 68 is greatly promoted so as to avoid an uneven washing of the clothes.

Additionally, in the embodiments of FIGS. 1 and 3 it is possible to obtain the effects such as a reduction of washing time caused by the friction to the entire load of clothes 34 or 69 and an increase of the expansion and contraction action, in addition to the water saving, detergent saving, reduction of water supply and draining time, and the like by virtue of the reduction of the washing liquid required in the washing machines W or W'. While the clothes washing machines W and W' have been described as utilizing a stirring wing or agitator 11 or 46, it is understood that the construction proposed by the present invention can utilize a pulsator for performing the washing operation. Likewise, while the embodiments of FIGS. 1 and 3 have been described as relating to a single washing tub type washing machine, as can be appreciated, such embodiments could employ a double washing tub type construction.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

What is claimed is:

1. A method of washing clothes in a clothes washing machine, the method comprising the steps of:

placing a predetermined amount of clothes into a washing tub means of the washing machine;

supplying an amount of washing liquid into said washing tub means which is 3–8 times larger than that of the clothes to be washed in a weight ratio to prevent the clothes from floating on and up in the washing liquid and thereby promoting friction along with expansion and contraction of the clothes;

rotating an agitator means provided in said washing tub machine means;

recirculating the washing liquid from said washing tube means;

supplying the circulating washing liquid into said washing tub means; and spraying the recirculated washing liquid on the clothes so as to enhance a washing of the clothes.

2. A method according to claim 1, wherein the step of rotating includes alternatingly rotating the agitator means in a clockwise and counterclockwise direction.

3. A method according to claim 1, wherein the agitator means in integrally connected to said working tub means, and wherein the step of rotating includes alternatingly rotating the agitator means and at least a portion of the washing tub means as a unit in a clockwise and counterclockwise direction.

4. A method according to claim 1, wherein the step of rotating includes rotating the agitator means by alternatingly stopping and reversing a direction of rotation of the agitator means for predetermined short periods of time.

5. A method according to claim 1, wherein the step of rotating includes rotating the agitator means i a clockwise and counterclockwise direction at a speed of about 180–190 rpm.

* * * * *